（12）United States Patent
He et al.

(10) Patent No.: US 10,121,053 B2
(45) Date of Patent: Nov. 6, 2018

(54) TOUCH DEVICE AND WAKING UP METHOD THEREOF

(71) Applicant: HIMAX TECHNOLOGIES LIMITED, Tainan (TW)

(72) Inventors: Jia-Ming He, Tainan (TW); Yaw-Guang Chang, Tainan (TW); Yi-Ying Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/362,778

(22) Filed: Nov. 28, 2016

(65) Prior Publication Data
US 2018/0150678 A1 May 31, 2018

(51) Int. Cl.
G09G 1/00 (2006.01)
G06K 9/00 (2006.01)
G06F 3/041 (2006.01)
G06F 3/044 (2006.01)
G06F 1/32 (2006.01)

(52) U.S. Cl.
CPC ....... *G06K 9/00087* (2013.01); *G06F 1/3218* (2013.01); *G06F 1/3262* (2013.01); *G06F 3/044* (2013.01); *G06F 3/0416* (2013.01)

(58) Field of Classification Search
CPC .......... G06F 1/00; G06F 3/044; G06F 3/0416; G06F 3/0414; G06F 3/0418
See application file for complete search history.

(56) References Cited

U.S. PATENT DOCUMENTS

| 2010/0156805 | A1* | 6/2010 | Brand | G06F 3/0416 345/173 |
| 2014/0204035 | A1* | 7/2014 | Chang | G06F 3/0416 345/173 |
| 2015/0169101 | A1* | 6/2015 | Jung | G06F 3/044 345/174 |
| 2015/0309610 | A1* | 10/2015 | Rabii | G06F 3/044 345/174 |

* cited by examiner

Primary Examiner — Michael Faragalla
(74) Attorney, Agent, or Firm — CKC & Partners Co., Ltd.

(57) ABSTRACT

A touch device and a waking up method thereof are provided. The touch device includes a sensing area and a sensing circuit. The sensing area includes sensing areas, and each sub sensing area includes sensing points. In the waking up method, at first, a sensing operation is performed at a first time point and a second time to obtain two total capacitance values of the sensing area at the first time point and the second time point. The scan operation scans a portion of the sensing points of each the sub sensing area, and a number of the portion of the sensing points is smaller than a number of the sensing points in one sub sensing area. Then, a difference between the two total capacitance values is calculated, and the touch device is waken up when the capacitance difference value is greater than a threshold capacitance value.

16 Claims, 9 Drawing Sheets

TOUCH DEVICE AND WAKING UP METHOD THEREOF

BACKGROUND

Field of Invention

The present invention relates to a touch device and a waking up method thereof. More particularly, the present invention relates to a touch panel and a waking up method thereof.

Description of Related Art

Power consumption is an important consideration when designing electronic devices such as mobile phones, notebooks and the like. In order to reduce power consumption, a power saving mode is used to temporarily shut down most circuit components of the electronic device. In this case, a detect mechanism is needed to determine whether to wake up the electronic device from the power saving mode, and to re-activate the circuit components that are temporarily shut down.

SUMMARY

The invention provides a touch panel and a waking up method thereof to reduce power consumption in a power saving mode.

According to an embodiment of the present invention, the touch device includes a sensing area and a sensing circuit. The sensing area is configured to sense a finger of a user, in which the sensing area includes a plurality of sub sensing areas, and each of the sub sensing areas comprises a plurality of sensing points. The sensing circuit is electrically connected to the sensing area, in which the sensing circuit is configured to scan a portion of the sensing points of each of the sub sensing areas, and a number of the portion of the sensing points is smaller than a number of the sensing points.

According to another embodiment of the present invention, in the waking up method of the touch device, at first a sensing operation is performed at a first time point to obtain a total capacitance value of the sensing area at the first time point. In the sensing operation, a scan operation is performed on each of the sub sensing areas to obtain a capacitance value of each of the sub sensing areas, in which the scan operation comprises scanning a portion of the sensing points of the sub sensing area to obtain the capacitance value of the sub sensing area, and a number of the portion of the sensing points is smaller than a number of the sensing points. Then, the capacitance value of each of the sub sensing area is summed up to obtain the total capacitance value. After the sensing operation performed at a first time point, the sensing operation is performed at a second time point to obtain a total capacitance value of the sensing area at the second time point. Thereafter, a capacitance difference value between the total capacitance value at the first time point and the total capacitance value at the second time point is calculated. Then, it is determined if an absolute value of the capacitance difference value is greater than a threshold capacitance value. Thereafter, the touch device is waken up when the capacitance difference value is greater than a threshold capacitance value.

According to further another embodiment of the present invention, in the waking up method of the touch device, at first a sensing operation is performed at a first time point to obtain a total capacitance value of the sensing area at the first time point. In the sensing operation, a scan operation is performed on each of the sub sensing areas to obtain a capacitance value of each of the sub sensing areas, in which the scan operation comprises scanning a portion of the sensing points of the sub sensing area to obtain the capacitance value of the sub sensing area, and a number of the portion of the sensing points is smaller than a number of the sensing points. Then, the capacitance value of each of the sub sensing area is summed up to obtain the total capacitance value. After the sensing operation performed at a first time point, the sensing operation is performed at a second time point to obtain a total capacitance value of the sensing area at the second time point. Thereafter, a capacitance difference value between the total capacitance value at the first time point and the total capacitance value at the second time point is calculated. Then, it is determined if an absolute value of the capacitance difference value is greater than a threshold capacitance value. Thereafter, a fingerprint recognition step is performed when the absolute value of the capacitance difference value is greater than the threshold capacitance value, in which the fingerprint recognition step is configure to determine if a fingerprint sensed by the sensing area is substantially the same as a standard fingerprint. Then, the touch device is waken up when the fingerprint sensed by the sensing area is substantially the same as the standard fingerprint.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
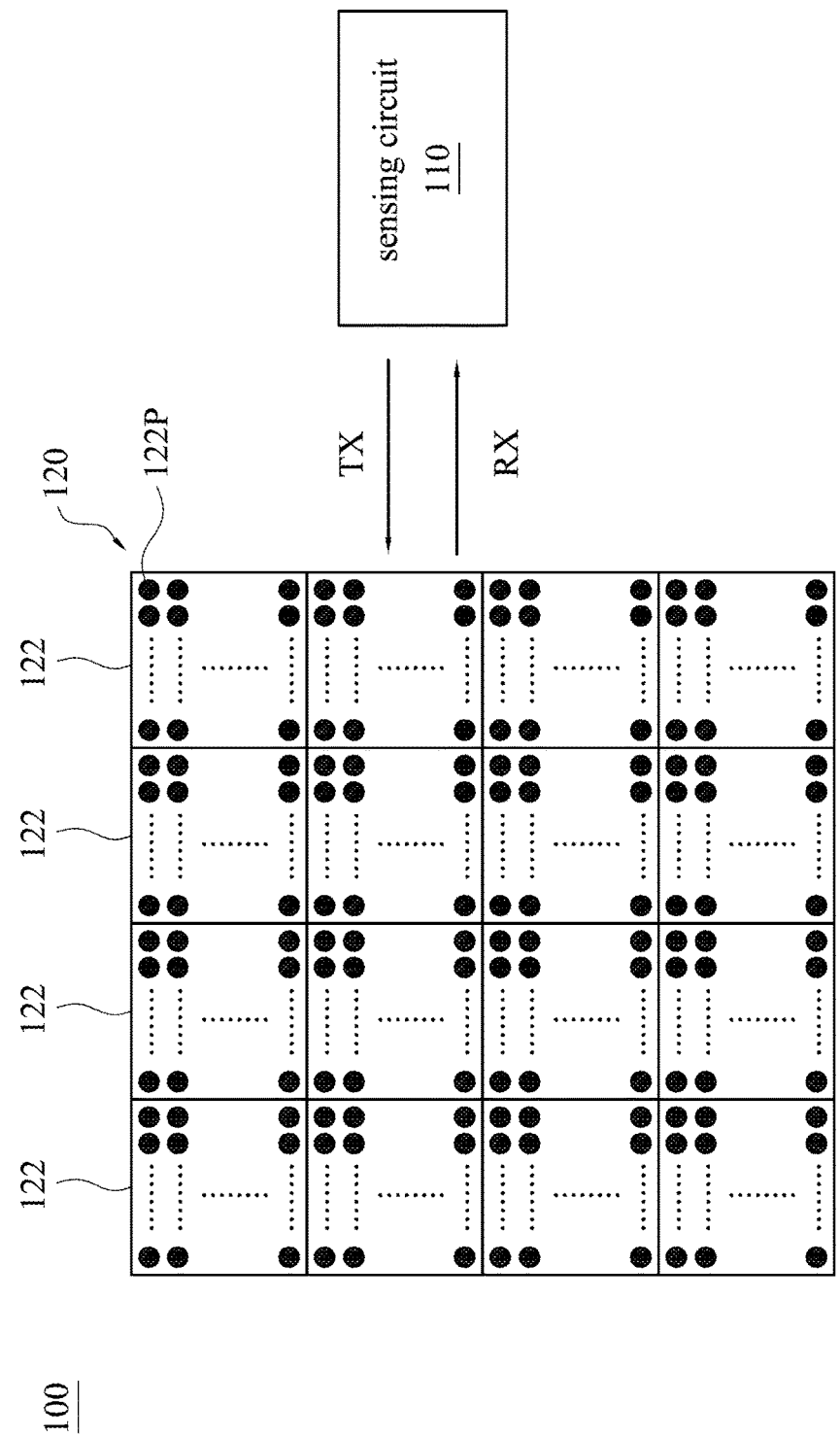
FIG. 1 is a schematic diagram showing a structure of a touch device in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, FIG. 1 is a schematic diagram showing a structure of a touch device 100 in accordance with an embodiment of the present invention. The touch device 100 includes a sensing circuit 110 and a sensing area 120. The sensing circuit 110 is electrically connected to the sensing area 120 to scan the sensing area 120 to determine if a user touches a screen of the touch device 100. If the touch device 100 is in a power saving mode, the touch device 100 is waken up from the power saving mode when the user touches a screen of the touch device 100.

The sensing circuit 110 transmits scan signals TX to the sensing area 120 and receives sensing signals RX from the sensing area 120 to sense a touch operation of the user. In some embodiments, the touch device 100 is a capacitive touch device, and the sensing circuit 110 senses a variation of a capacitance value of the sensing area 120 to achieve the purpose of sensing the touch operation of the user, but embodiments of the present invention are not limited thereto.

The sensing area 120 includes a plurality of sub sensing areas 122, and each of the sub sensing areas 122 includes a plurality of sensing points 122P. The sub sensing areas 122 are arranged in a matrix, and the sensing points 122P are arranged in a matrix, too. In this embodiment, each of the sensing points 122P corresponds to an equivalent capacitor, and the sensing circuit 110 scans the sensing point 122P to sense a capacitance value of the equivalent capacitor. However, embodiments of the present invention are not limited thereto.

Figure 2:
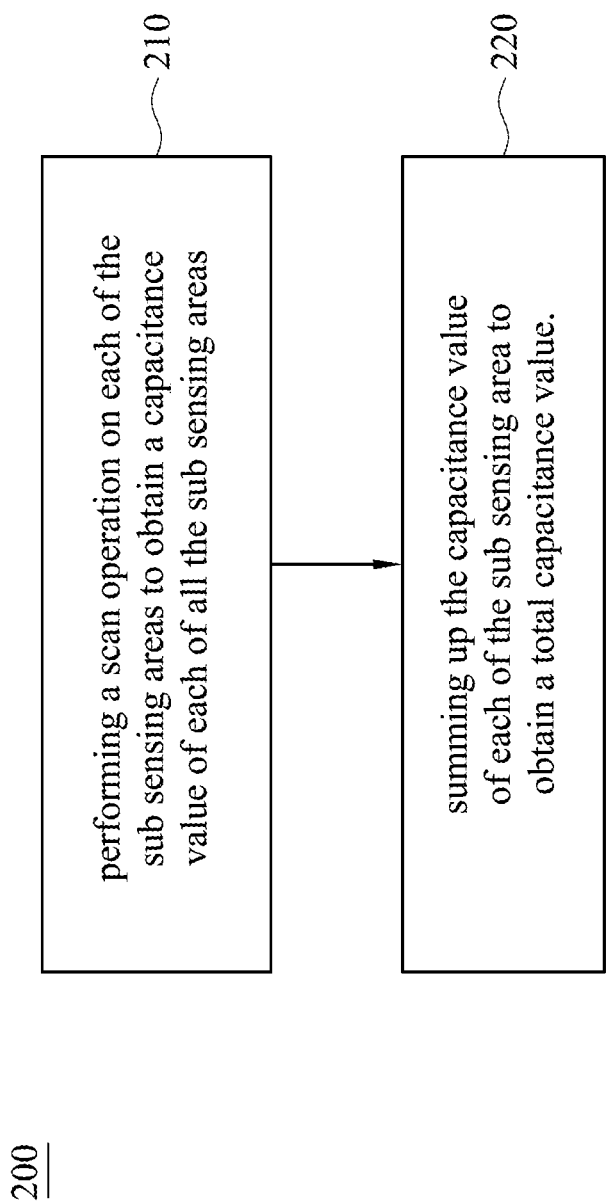
FIG. 2 is a schematic diagram showing a flow chart of a sensing operation of the touch device in accordance with an embodiment of the present invention.

Referring to FIG. 2, FIG. 2 is a schematic diagram showing a flow chart of a sensing operation 200 of the touch device 100 in accordance with an embodiment of the present invention, in which the sensing operation 200 is performed when the touch device 100 is in a power saving mode. The sensing operation 200 begins at a step 210. In the step 210, the sensing circuit 110 sequentially performs a scan operation on each of the sub sensing areas 122 to obtain a capacitance value of each of all the sub sensing areas 122. In this embodiment, the sensing circuit 110 scans a portion of the sensing point 122P instead of scanning all the sensing point 122P, and a number of the scanned sensing points 122P in a sub sensing area 122 is smaller than a number of all the sensing points 122P in the sub sensing area 122.

For example, when a sub sensing area 122 is chosen to be scanned, the sensing circuit 110 scans a column of the sensing points 122P in the chosen sub sensing areas 122. A sum of capacitance values of the column of the sensing points 122P is used to represent a capacitance value of the chosen sub sensing area 122. For another example, when a sub sensing area 122 is chosen to be scanned, the sensing circuit 110 scans only one sensing points 122P in the chosen sub sensing areas 122. However, embodiments of the present invention are not limited thereto.

After the step 210, a step 220 is performed to sum up the capacitance value of each of the sub sensing area 122 to obtain a total capacitance value. The total capacitance value is used to represent a capacitance value of the sensing area 120. In this embodiment, the step 220 is performed by using the sensing circuit 110. However, embodiments of the present invention are not limited thereto.

It can be understood the sensing operation 200 enables the touch device 100 to have small power consumption when scanning the sensing area 120 in a power saving mode, since only a portion of the sensing points 122P are scanned for each of the sub areas 122. It is noted that the touch device 100 continues the sensing operation 200 when the touch device 100 is in the power saving mode. In this embodiment, the touch device 100 performs the sensing operation 200 every 400 micro second (μs). However, embodiments of the present invention are no limited thereto.

Figure 3:
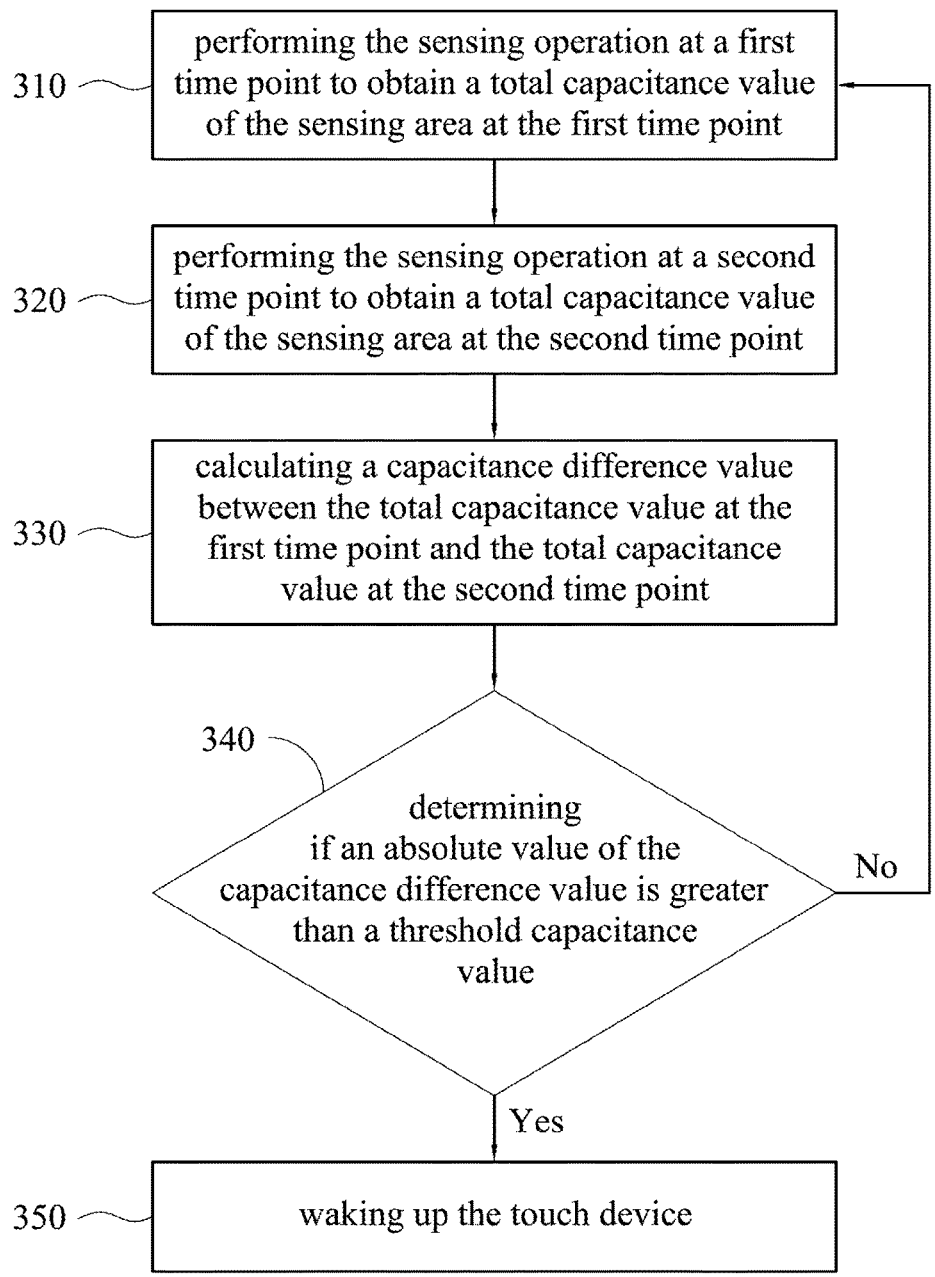
FIG. 3 is a schematic diagram showing a flow chart of a waking up method of the touch device in accordance with an embodiment of the present invention.

Referring to FIG. 3, FIG. 3 is a schematic diagram showing a flow chart of a waking up method 300 of the touch device 100 in accordance with an embodiment of the present invention. The waking up method 300 begins at a step 310. In the step 310, the sensing operation 200 is performed at a first time point to obtain a total capacitance value of the sub sensing area 122 of the sensing area 120 at the first time point. Then, in a step 320, the sensing operation 200 is performed at a second time point to obtain a total capacitance value of the sub sensing area 122 of the sensing area 120 at the second time point. In this embodiment, the first time point and the second time point are continuous. For example, a time interval between the first time point and the second time point is 400 μs, since the touch device 100 performs the sensing operation 200 every 400 μs.

Thereafter, a step 330 is performed to calculate a difference value (also referred to as capacitance difference value hereinafter) between the total capacitance value at the first time point and the total capacitance value at the second time point. Then, a step 340 is performed to determine if an absolute value of the capacitance difference value is greater than a threshold capacitance value. When the capacitance difference value is greater than a threshold capacitance value, it is determined that a user touches the screen of the touch device 100, and then a step 350 is performed to wake up the touch device 100.

It can be understood the waking up method 300 enables the touch device 100 to have small power consumption in the power saving mode, since the waking up method 300 uses the sensing operation 200.

Figure 4:
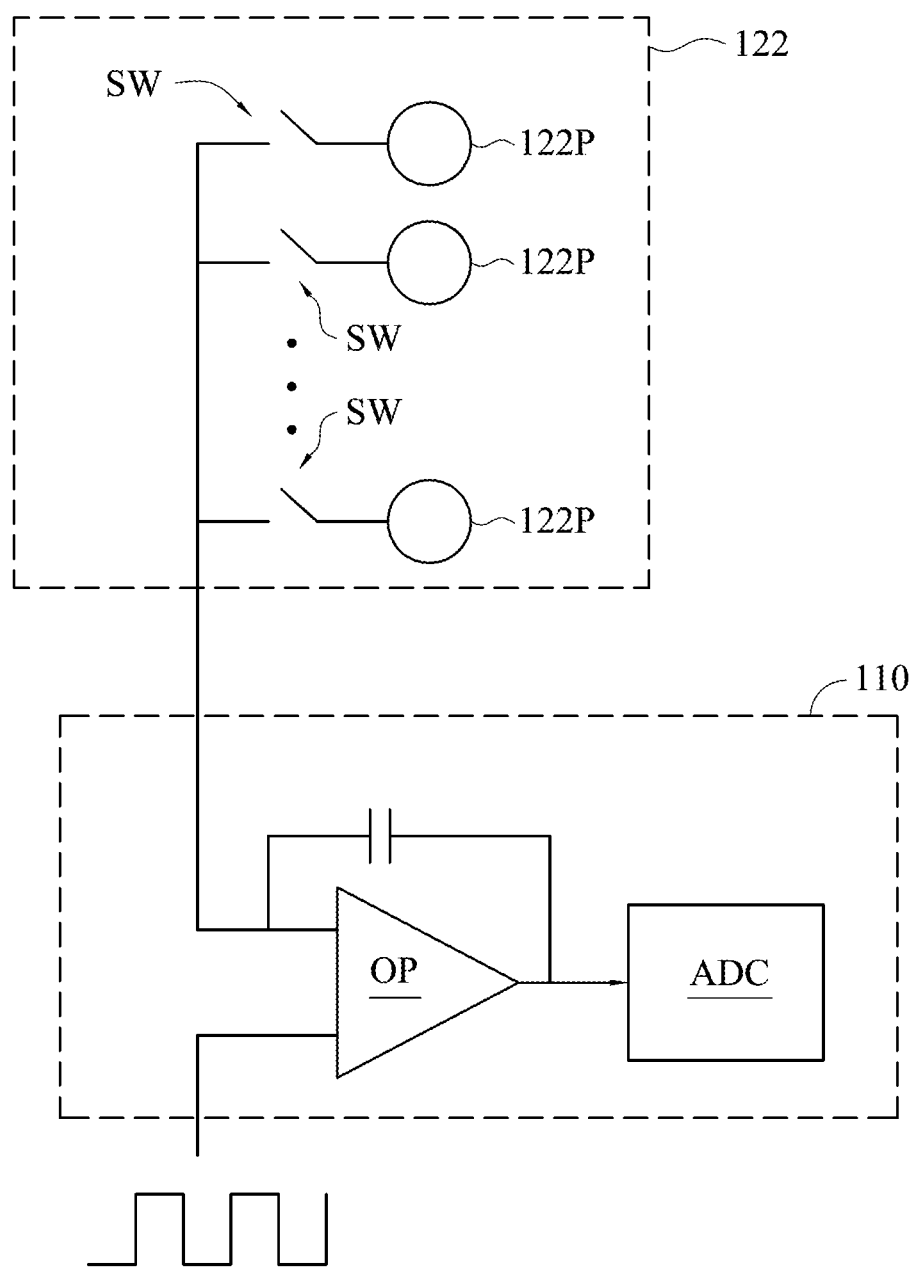
FIG. 4 is a schematic diagram showing a partial circuit structure of a touch device in accordance with another embodiment of the present invention.
Figure 5:
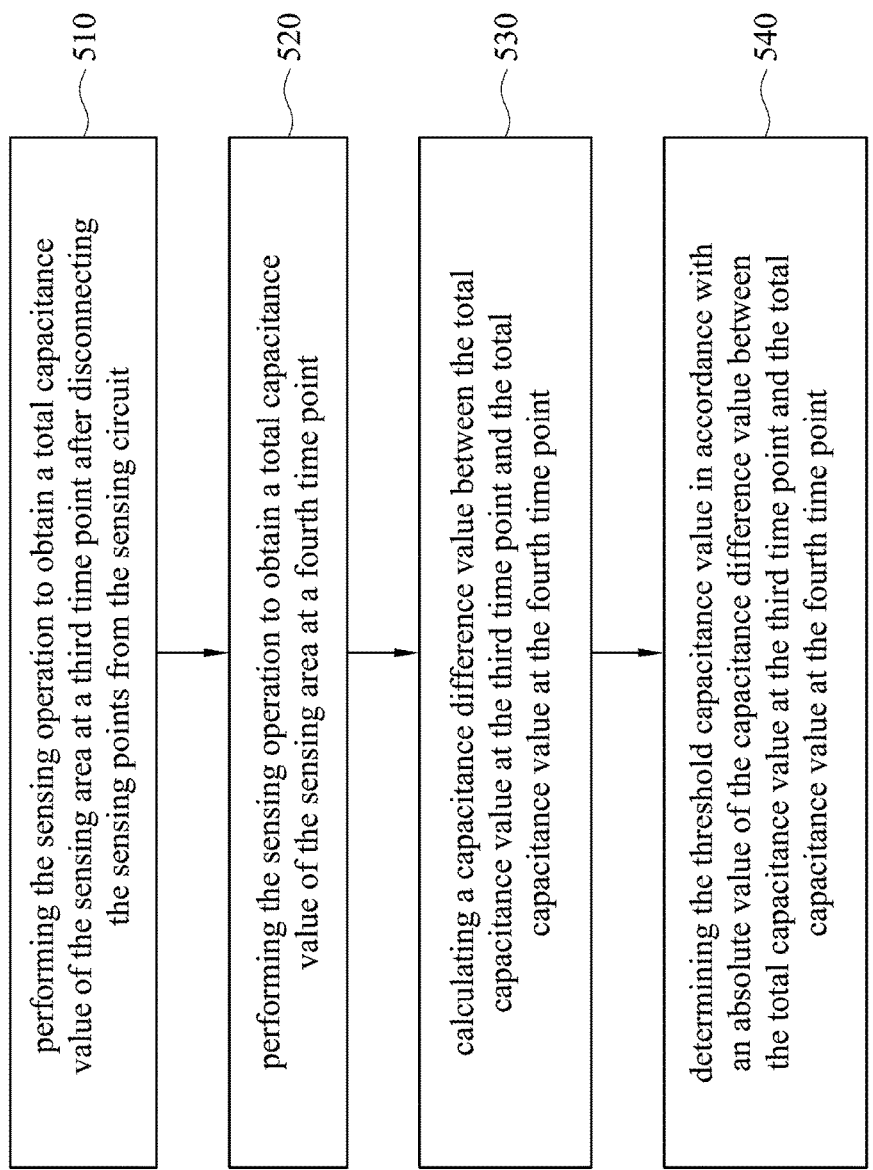
FIG. 5 is a schematic diagram showing a flow chart of a threshold capacitance value calculation step adapted for the touch device.

Referring to FIG. 4 and FIG. 5, FIG. 4 is a schematic diagram showing a partial circuit structure of a touch device 400 in accordance with another embodiment of the present invention, and FIG. 5 is a schematic diagram showing a flow chart of a threshold capacitance value calculation step 500 adapted for the touch device 400. The touch device 400 is similar to the touch device 100, but the difference is in that the touch device 400 includes a plurality of switches SW connected between the sensing points 122P and the sensing circuit 110. In this embodiment, the sensing circuit 110 includes an operational amplifier circuit OP and an Analog-to Digital converter ADC, and the switches SW electrically connected between the operational amplifier circuit OP and the sensing points 122P, thereby disconnecting the sensing points 122P from the sensing circuit 110.

Figure 6:
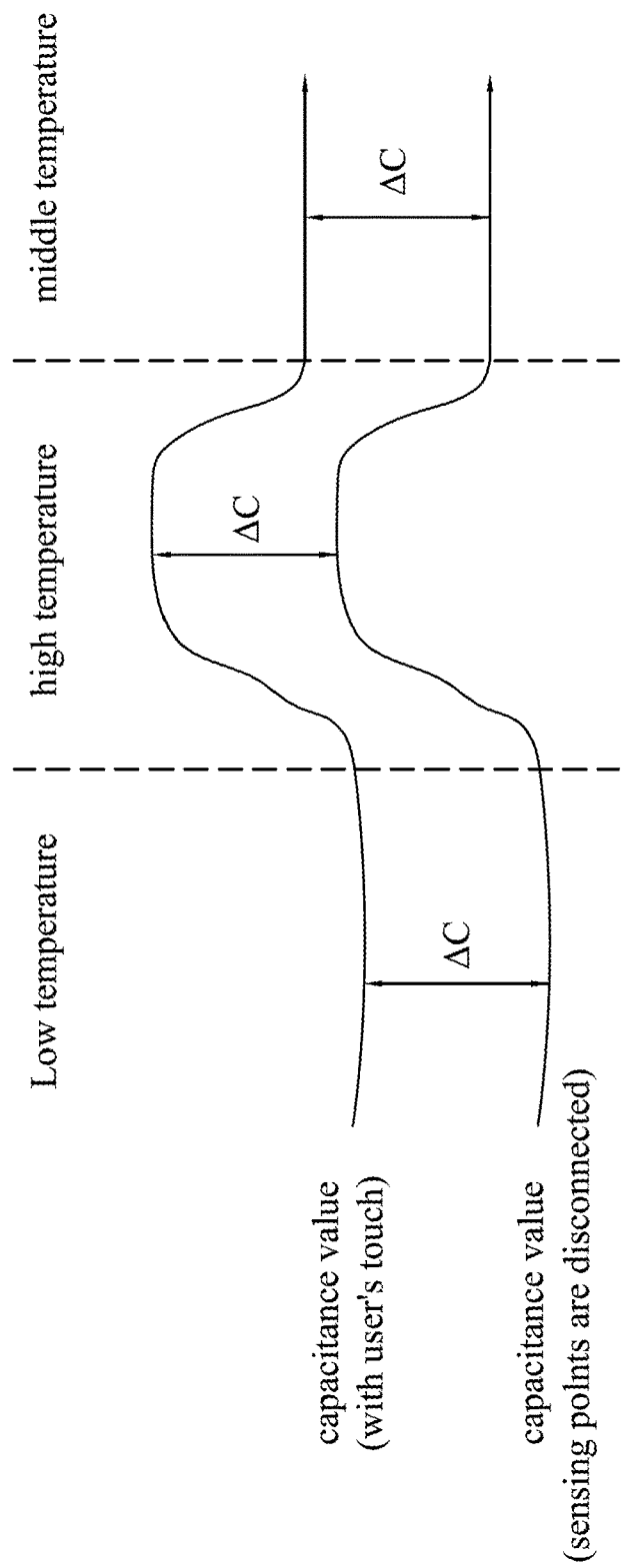
FIG. 6 is a schematic diagram showing how the change of environment interferes with the capacitance value of the sensing area.

The threshold capacitance value calculation step 500 is used to calculate the threshold capacitance value used in the step 340 for a purpose of avoiding interference of change of environment. For example, when the user travels from a pace having a low temperature to a place having a high temperature, the change of the environment may interfere with the determination of the user's touch. Referring to FIG. 6, FIG. 6 is a schematic diagram showing how the change of environment interferes with the capacitance value of the sensing area 120. As shown in FIG. 6, when the temperature of the environment is increased, the capacitance value of the sensing area 120 is increased, too. Further, when the temperature of the environment is decreased, the capacitance value of the sensing area 120 is decreased, too.

To avoid the interference caused by the temperature change of the environment, the threshold capacitance value calculation step 500 provides a threshold capacitance value for the step 340 of the waking up method 300. As shown in FIG. 6, although the capacitance value of the sensing area 120 is changed with the temperature change of the environment, a capacitance difference value ΔC is substantially equal to a constant. Therefore, the capacitance difference value ΔC can be used to avoid the interference caused by the temperature change of the environment.

The threshold capacitance value calculation step 500 begins at a step 510. In the step 510, the sensing operation 200 is performed to obtain a total capacitance value of the sensing area 120 at a third time point after disconnecting the sensing points 122P from the sensing circuit 110. In this embodiment, the switches SW are configured to disconnect the sensing points 122P from the sensing circuit 110 to avoid influence caused by the user's finger. The total capacitance value obtained by the step 510 can be considered as a capacitance value of paths through which the scan signals TX and the sensing signals RX pass.

Thereafter, in a step 520, the sensing operation 200 is performed to obtain a total capacitance value of the sensing area at a fourth time point when the user's finger touches the sensing area 120 and the switches SW are normally operated to sense the user's touch. In this embodiment, the third time point and the fourth time point are continuous, and the fourth time point is after the third time point. In some embodiments, the fourth time point can be before the third time point.

Then, a step 530 is performed to calculate a capacitance difference value ΔC between the total capacitance value at the third time point and the total capacitance value at the fourth time point. Thereafter, a step 540 is performed to determine the threshold capacitance value in accordance with an absolute value of the capacitance difference value ΔC between the total capacitance value at the third time point and the total capacitance value at the fourth time point. In this embodiment, the threshold capacitance value is equal to half of the capacitance difference value ΔC between the total capacitance value at the third time point and the total capacitance value at the fourth time point. However, embodiments of the present invention are not limited thereto.

For example, when the user's finger touches the touch device 400 to store a fingerprint as a standard fingerprint for fingerprint recognition, the threshold capacitance value calculation step 500 can be performed together. Specifically, the step 510 is performed to disconnect the sensing points 122P from the sensing circuit 110 to obtain the total capacitance value at the third time point, and the step 520 is performed to sense the user's finger to obtain the total capacitance values at the fourth time point. Then, the step 530 is performed to calculate a difference value between the total capacitance value at the third time point and the total capacitance value at the fourth time point, and a half of the capacitance difference value is determined to be the threshold capacitance value of the step 340 by the step 540.

Figure 7:
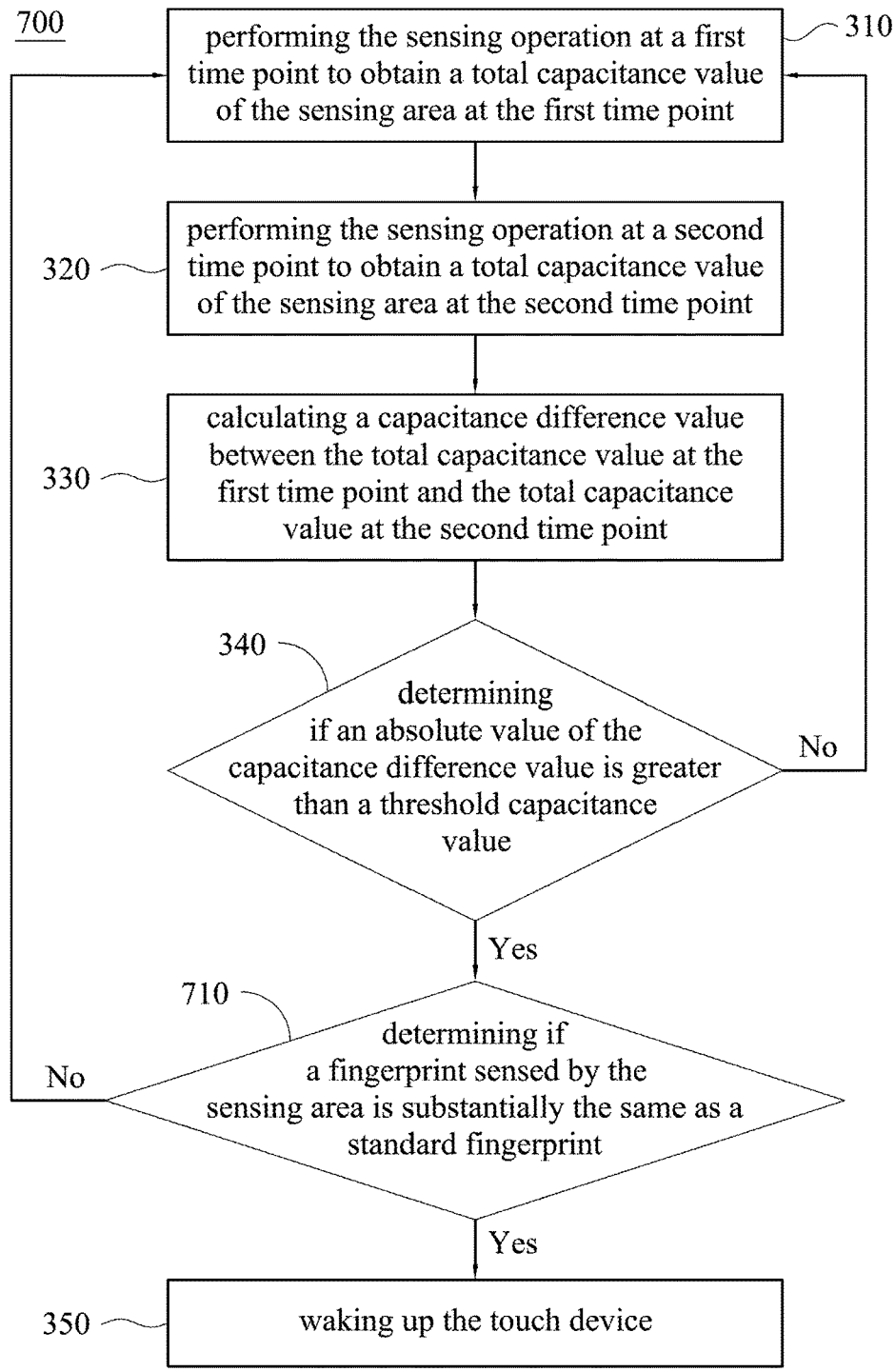
FIG. 7 is a schematic diagram showing a flow chart of a waking up method of the touch device in accordance with an embodiment of the present invention.

Referring to FIG. 7, FIG. 7 is a schematic diagram showing a flow chart of a waking up method 700 of the touch device 400 in accordance with an embodiment of the present invention. The waking up method 700 is similar to the waking up method 300, but the difference is in that a step 710 is performed when the absolute value of the capacitance difference value is greater than the threshold capacitance value. In the step 710, a fingerprint recognition step is performed to determine if a fingerprint sensed by the sensing area 120 is substantially the same as a standard fingerprint. When the fingerprint sensed by the sensing area 120 is substantially the same as the standard fingerprint, the touch device 400 is waken up from the power saving mode.

The step 710 is used to ensure that the user trying to wake up the touch device 400 is the owner of the touch device 400, thereby protecting the data stored in the touch device 400.

Figure 8:
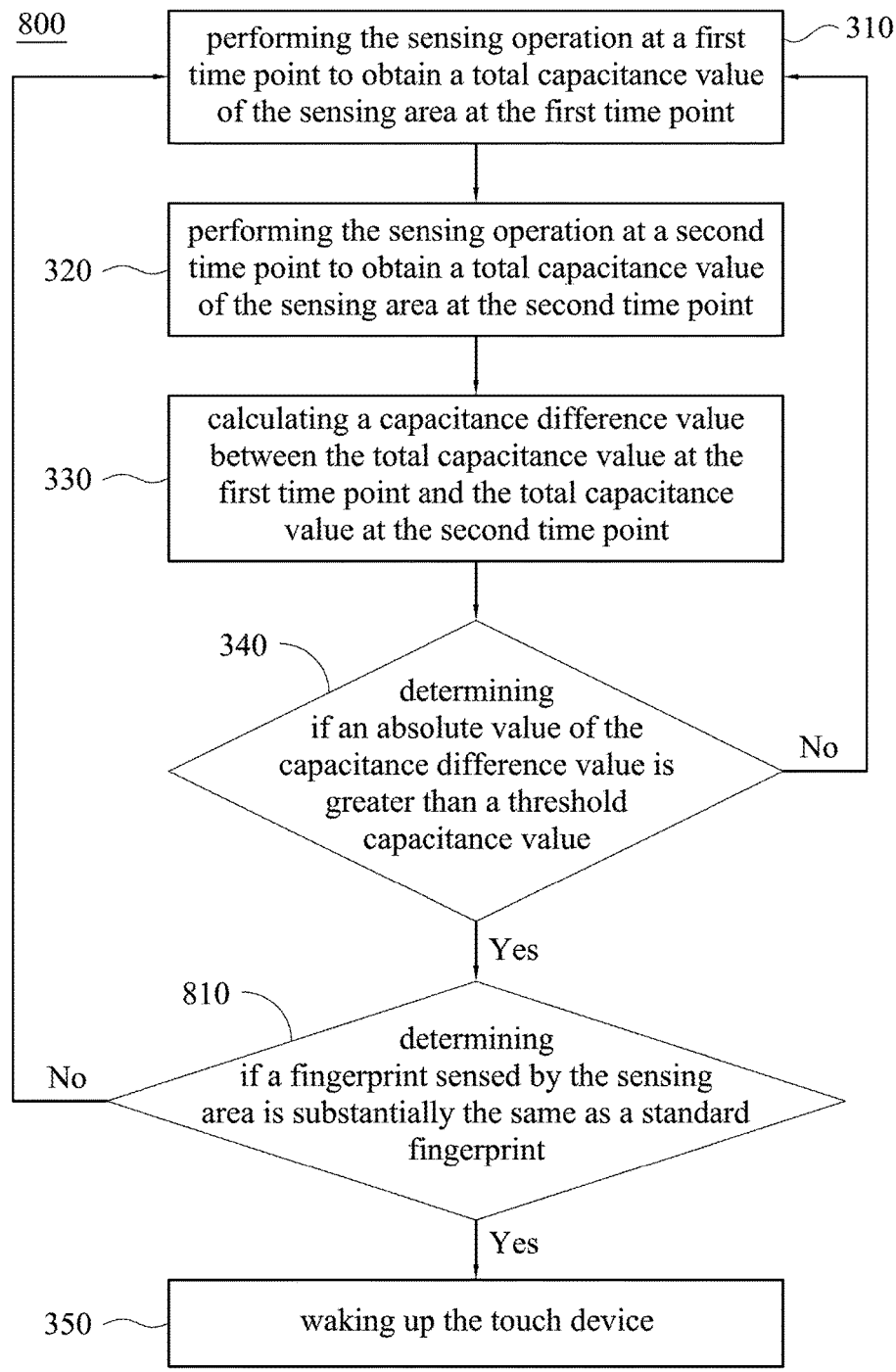
FIG. 8 is a schematic diagram showing a flow chart of a waking up method of the touch device in accordance with an embodiment of the present invention.
Figure 9:
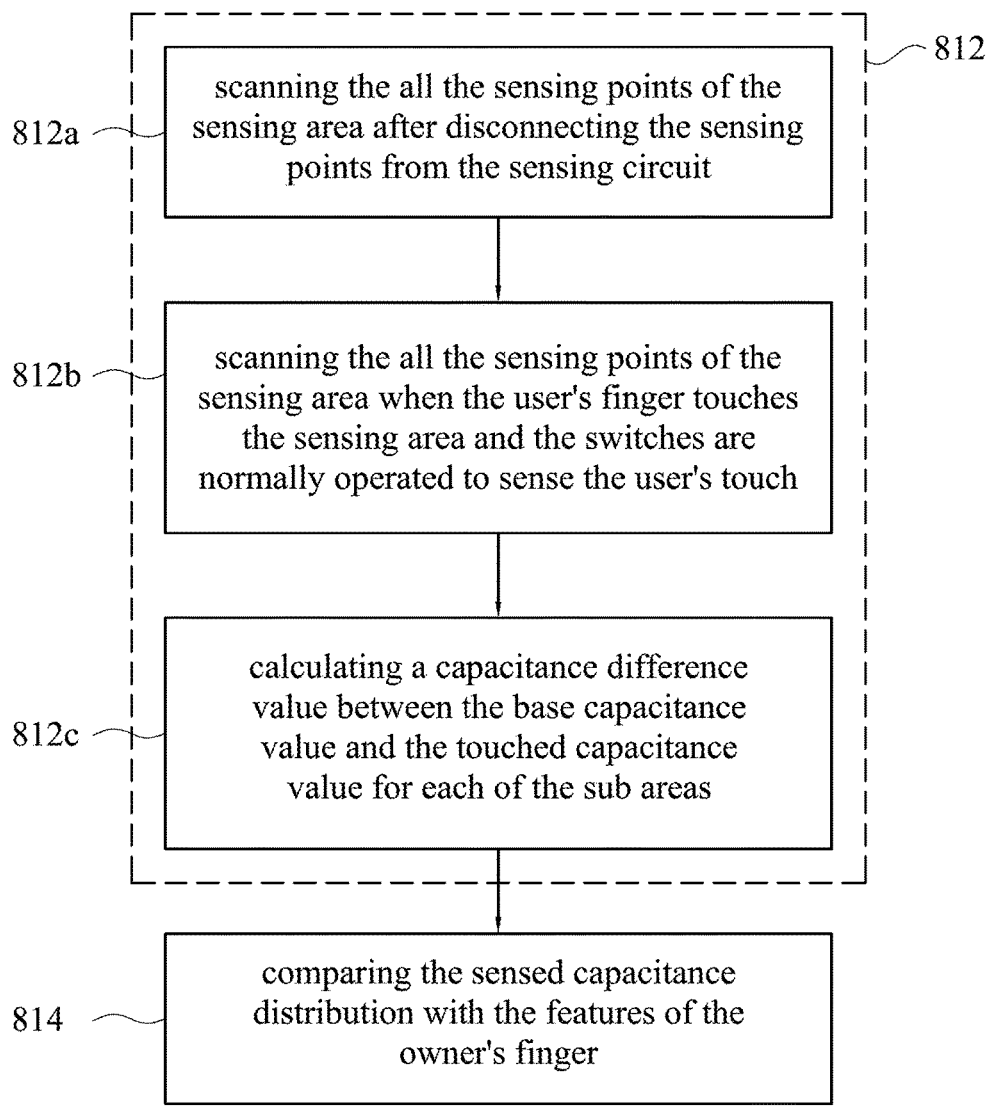
FIG. 9 is a schematic diagram showing a flow chart of a step of the waking up method.

Referring to FIG. 8 and FIG. 9, FIG. 8 is a schematic diagram showing a flow chart of a waking up method 800 of the touch device 400 in accordance with an embodiment of the present invention, FIG. 9 is a schematic diagram showing a flow chart of a step 900 included by a step 810 of the waking up method 800. The waking up method 800 is similar to the waking up method 700, but the difference is in that the step 710 is replaced by a step 810 performed to conduct another fingerprint recognition step for the purpose of avoiding interference of the change of environment. In this embodiment, the step 810 includes the step 900 performed to use capacitance differences to avoid the interference of the change of the environment. In some other embodiments, the step 810 may further include other steps performed to improve quality of finger recognition.

As shown in FIG. 9, the step 900 includes a fingerprint calculation stage 812 and a determination stage 814. The fingerprint calculation stage 812 is performed to obtain a fingerprint sensed by the sensing area 120, and the determination stage 814 is performed to determine if the sensed fingerprint is substantially the same as a standard fingerprint.

In the fingerprint calculation stage 812, at first, a step 812a is performed to scan the all the sensing points 122P of the sensing area 120 after disconnecting the sensing points 122P from the sensing circuit 110. The step 812a is similar to the step 510 of the threshold capacitance value calculation step 500. However, the step 812a does not only scan a portion of the sensing points 122P for each of the sub areas 122. In contrast, the step 812a scans all the sensing points 122P for each of the sub areas 122, thereby obtaining a base capacitance value of each of the sub areas 122. It is noted that the base capacitance value is a sum of the capacitance values of all the sensing points 122P of the sub area 122.

Then, a step 812b is performed to scan the all the sensing points 122P of the sensing area 120 when the user's finger touches the sensing area 120 and the switches SW are normally operated to sense the user's touch. The step 812b is similar to the step 520 of the threshold capacitance value calculation step 500. However, the step 812b scans all the sensing points 122P for each of the sub areas 122, thereby obtaining a touched capacitance value of each of the sub areas 122. It is noted that the touched capacitance value is a sum of the capacitance values of all the sensing points 122P of the sub area 122 when the user's finger touches the sensing area 120.

Thereafter, a step 812c is performed to calculate a capacitance difference value between the base capacitance value and the touched capacitance value for each of the sub areas 122, thereby obtaining a sensed capacitance distribution of the sub areas 122. The sensed capacitance distribution of the sub areas 122 includes but not limited to a relationship between the capacitance difference values of the sub areas 122 and corresponding locations. In this embodiment, the sensed capacitance distribution is considered as the fingerprint sensed by the sensing area 120.

Then, the stage 814 is performed to conduct a fingerprint recognition function in accordance with the sensed capacitance distribution and a standard fingerprint. For example, the standard fingerprint includes features of the owner's finger. The stage 814 compares the sensed capacitance distribution with the features of the owner's finger to determine if the touch device 400 is waken up. Specifically, when the sensed capacitance distribution matches the features of the owner's finger, the step 350 is [performed to wake up the touch device 400.

It can be understood that the capacitance difference values are used to represent the sensed capacitance distribution of the sub areas 122, and thus the interference of the change of environment is avoided.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A waking up method of a touch device, wherein the touch device comprises a sensing area comprising a plurality of sub sensing areas, and each of the sub sensing areas comprises a plurality of sensing points, and the waking up method comprises:
   performing a sensing operation at a first time point to obtain a total capacitance value of the sensing area at the first time point, wherein the sensing operation comprises:
      sequentially performing a scan operation on each of the sub sensing areas to obtain a capacitance value of each of the sub sensing areas, wherein the scan operation comprises scanning a portion of the sensing points of the sub sensing area to obtain the capacitance value of the sub sensing area, and a number of the portion of the sensing points is smaller than a number of the sensing points; and
      summing up the capacitance value of each of the sub sensing area to obtain the total capacitance value;
   performing the sensing operation at a second time point to obtain a total capacitance value of the sensing area at the second time point;
   calculating a capacitance difference value between the total capacitance value at the first time point and the total capacitance value at the second time point;
   determining if an absolute value of the capacitance difference value is greater than a threshold capacitance value; and
   waking up the touch device when the capacitance difference value is greater than a threshold capacitance value.

2. The waking up method as claimed in claim 1, wherein the first time point and the second time point are continuous.

3. The waking up method as claimed in claim 1, wherein the sub sensing areas are arranged in a matrix, and the sensing points are arranged in a matrix, and the portion of the sensing points is one line of the sensing points.

4. The waking up method as claimed in claim 1, further comprising performing a threshold capacitance value calculation step comprising:
   performing the sensing operation to obtain a total capacitance value of the sensing area at a third time point after disconnecting the sensing points from a sensing circuit;
   performing the sensing operation to obtain a total capacitance value of the sensing area at a fourth time point when a user touches the sensing area;
   calculating a capacitance difference value between the total capacitance value at the third time point and the total capacitance value at the fourth time point; and
   determining the threshold capacitance value in accordance with an absolute value of the capacitance difference value between the total capacitance value at the third time point and the total capacitance value at the fourth time point.

5. The waking up method as claimed in claim 4, wherein the threshold capacitance value is equal to half of the capacitance difference value between the total capacitance value at the third time point and the total capacitance value at the fourth time point.

6. The waking up method as claimed in claim 4, wherein the third time point and the fourth time point are continuous, and the fourth time point is after the third time point.

7. A touch device, comprising:
   a sensing area configured to sense a finger of a user, wherein the sensing area comprises a plurality of sub sensing areas, and each of the sub sensing areas comprises a plurality of sensing points; and
   a sensing circuit electrically connected to the sensing area, wherein the sensing circuit is configured to perform steps of a waking up method of the touch device comprising:
   performing a sensing operation at a first time point to obtain a total capacitance value of the sensing area at the first time point, wherein the sensing operation comprises:
      sequentially performing a scan operation on each of the sub sensing areas to obtain a capacitance value of each of the sub sensing areas, wherein the scan operation comprises scanning a portion of the sensing points of the sub sensing area to obtain the capacitance value of the sub sensing area, and a number of the portion of the sensing points is smaller than a number of the sensing points; and
      summing up the capacitance value of each of the sub sensing area to obtain the total capacitance value;
   performing the sensing operation at a second time point to obtain a total capacitance value of the sensing area at the second time point;
   calculating a capacitance difference value between the total capacitance value at the first time point and the total capacitance value at the second time point;
   determining if an absolute value of the capacitance difference value is greater than a threshold capacitance value; and
   waking up the touch device when the capacitance difference value is greater than a threshold capacitance value.

8. The touch device as claimed in claim 7, wherein the sub sensing areas are arranged in a matrix, and the sensing points are arranged in a matrix.

9. The touch device as claimed in claim 7, wherein the portion of the sensing points is one column of the sensing points.

10. The touch device as claimed in claim 7, wherein the touch device is a capacitive touch device.

11. A waking up method of a touch device, wherein the touch device comprises a sensing area comprising a plurality of sub sensing areas, and each of the sub sensing areas comprises a plurality of sensing points, and the waking up method comprises:
   performing a sensing operation at a first time point to obtain a total capacitance value of the sensing area at the first time point, wherein the sensing operation comprises:

sequentially performing a scan operation on each of the sub sensing areas to obtain a capacitance value of each of the sub sensing areas, wherein the scan operation comprises scanning a portion of the sensing points of the sub sensing area to obtain the capacitance value of the sub sensing area, and a number of the portion of the sensing points is smaller than a number of the sensing points; and summing up the capacitance value of each of the sub sensing area to obtain the total capacitance value;

performing the sensing operation at a second time point to obtain a total capacitance value of the sensing area at the second time point;

calculating a capacitance difference value between the total capacitance value at the first time point and the total capacitance value at the second time point;

determining if an absolute value of the capacitance difference value is greater than a threshold capacitance value;

performing a fingerprint recognition step when the absolute value of the capacitance difference value is greater than the threshold capacitance value, wherein the fingerprint recognition step is configure to determine if a fingerprint sensed by the sensing area is substantially the same as a standard fingerprint; and waking up the touch device when the fingerprint sensed by the sensing area is substantially the same as the standard fingerprint.

12. The waking up method as claimed in claim 11, wherein the first time point and the second time point are continuous.

13. The waking up method as claimed in claim 11, wherein the sub sensing areas are arranged in a matrix, and the sensing points are arranged in a matrix, and the portion of the sensing points is one line of the sensing points.

14. The waking up method as claimed in claim 11, further comprising performing a threshold capacitance value calculation step comprising:

performing the sensing operation to obtain a total capacitance value of the sensing area at a third time point after disconnecting the sensing points from a sensing circuit;

performing the sensing operation to obtain a total capacitance value of the sensing area at a fourth time point;

calculating a capacitance difference value between the total capacitance value at the third time point and the total capacitance value at the fourth time point; and determining the threshold capacitance value in accordance with an absolute value of the capacitance difference value between the total capacitance value at the third time point and the total capacitance value at the fourth time point.

15. The waking up method as claimed in claim 14, wherein the threshold capacitance value is equal to half of the capacitance difference value between the total capacitance value at the third time point and the total capacitance value at the fourth time point, and the third time point and the fourth time point are continuous, and the fourth time point is after the third time point.

16. The waking up method as claimed in claim 14, wherein the fingerprint recognition step comprises:

sequentially performing a scan operation on each of the sub sensing areas after disconnecting the sensing points from a sensing circuit, to obtain a base capacitance value of each of the sub sensing areas, wherein the scan operation comprises scanning all the sensing points of the sub sensing area;

sequentially performing the scan operation on each of the sub sensing areas when a user touches the sensing area, to obtain a touched capacitance value of each of the sub areas;

calculating a capacitance difference value between the base capacitance value and the touched capacitance value of each of the sub areas; and comparing a sensed capacitance distribution with a standard fingerprint, wherein the sensed capacitance distribution comprises the capacitance difference value of each of the sub areas.

* * * * *